(12) United States Patent
Moskovits et al.

(10) Patent No.: US 8,120,861 B2
(45) Date of Patent: Feb. 21, 2012

(54) PATTERNED POLARIZATION-SENSITIVE OPTICAL ELEMENTS AND DEVICES USING THE SAME

(76) Inventors: Martin Moskovits, Santa Barbara, CA (US); Qihong Wu, Somerset, NJ (US); Robert Koefer, Whitehall, PA (US); Xu Zhang, Montville, NJ (US); Linh Nguyen, Allentown, PA (US); Thomas Tombler, Somerset, NJ (US)

( * ) Notice: Subject to any disclaimer, the term of this patent is extended or adjusted under 35 U.S.C. 154(b) by 381 days.

(21) Appl. No.: 12/563,597

(22) Filed: Sep. 21, 2009

(65) Prior Publication Data
US 2010/0073756 A1    Mar. 25, 2010

Related U.S. Application Data

(60) Provisional application No. 61/099,045, filed on Sep. 22, 2008.

(51) Int. Cl.
*G02B 7/02* (2006.01)

(52) U.S. Cl. ...................................... 359/819

(58) Field of Classification Search .................... 359/13, 359/14, 281, 437, 501, 630, 819; 348/E13.038; 385/11; 264/1.34; 356/493
See application file for complete search history.

(56) References Cited

U.S. PATENT DOCUMENTS
2005/0277063 A1   12/2005   Wang
2006/0127829 A1   6/2006    Deng

*Primary Examiner* — Ricky L. Mack
*Assistant Examiner* — Mahidere Sahle
(74) *Attorney, Agent, or Firm* — Fish & Associates, PC

(57) ABSTRACT

In general, in one aspect, the invention features an apparatus that includes a plurality of optical elements arranged to form an image of an object. The elements include a first element comprising one or more regions of a polarizing material, the regions being shaped as one or more visual features, a polarizer, and a mounting assembly including a first mount for the first element and a second mount for the polarizer. At least the first or second mount is rotatable with respect to an optical axis between a first orientation and a second orientation. In the first orientation, the visual features are visible in the image of the object and, in the second orientation, the visual features are not visible in the image of the object.

20 Claims, 3 Drawing Sheets

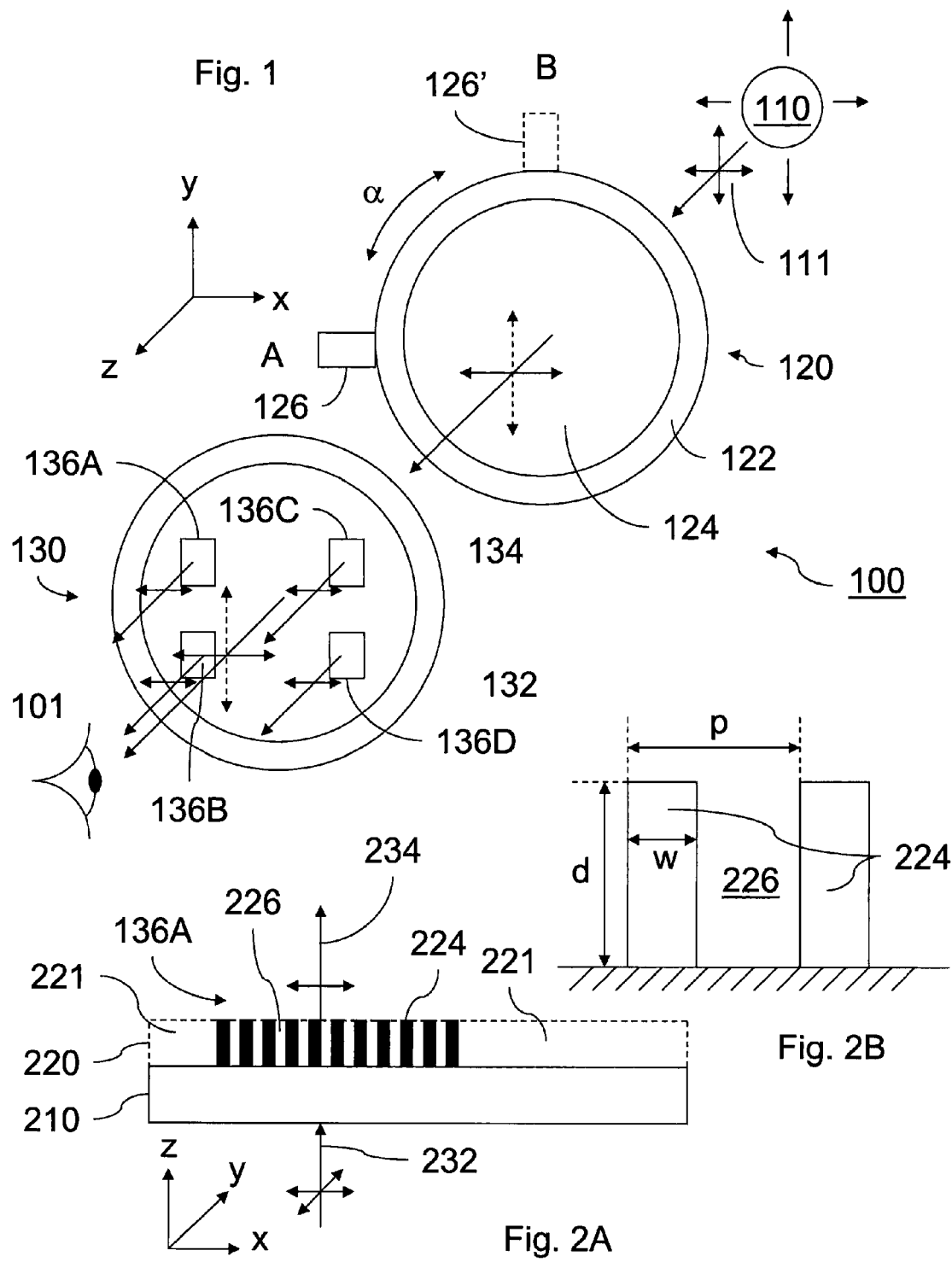

PATTERNED POLARIZATION-SENSITIVE OPTICAL ELEMENTS AND DEVICES USING THE SAME

CROSS-REFERENCE TO RELATED APPLICATIONS

This application claims priority to Provisional Patent Application No. 61/099,045, entitled "PATTERNED POLARIZATION-SENSITIVE OPTICAL ELEMENTS AND DEVICES USING THE SAME," filed on Sep. 22, 2008, the entire contents of which is incorporated herein by reference.

TECHNICAL FIELD

This disclosure relates to optical devices, and more particularly to optical devices that include patterned polarization-sensitive optical elements.

BACKGROUND

Optical imaging devices include binoculars, telescopes, range finders, and microscopes, for example. In some cases, in addition to presenting an image of the object under study, such devices provide information in the user's field of view. For example, range finders may include grid lines or alpha-numeric information that assists the viewer in the devices operation. Microscopes, as another example, can present gridlines in the users field of view as a scale to allow the user to size features they are viewing. In many cases, such information is fixed in the field of view or removable only by physical removal of an optical element in the light path from the object to the viewer.

SUMMARY

Patterned polarization-sensitive optical elements and devices using such elements are disclosed. In general, the optical element includes a polarizer that is patterned to provide either text, numerals, lines, pictures or other visual features that are visible when illuminated with light in one polarization state, but invisible to a viewer when illuminated with light in the opposite polarization state. In embodiments, the patterned polarizer is formed of a wire-grid polarizer such that the text, numerals, lines, pictures or other visual features are composed of a linearly polarizing array of metal grid lines, or in which the background to such elements consist of the linearly polarizing array of metal grid lines with the visual element(s) composed of a non-polarizing material.

The contrast of the visual elements can be continuously adjusted by varying the direction of polarization of light illuminating the optical element, thereby providing comparative information with the desired or optimal contrast level as seen by a human operator or by an electronic image sensor.

In some embodiments, the visual features can be used to improve the viewing of a target image while simultaneously comparing it with material previously written on the optical element. For example, the visual features can provide an estimate of the dimensions of features in the viewed image, can help in relative positioning of features in an image, and/or can allow a comparison to be made between features in the viewed image and a predetermined control image.

In general, the optical elements can be used in a variety of applications. For example, such elements can be used to providing fiducial markings, metrological rulings, images, maps or other patterns for comparative range finding or target determination applications. Other applications are discussed below.

In general, in one aspect, the invention features an apparatus that includes a plurality of optical elements arranged to form an image of an object. The elements include a first element comprising one or more regions of a polarizing material, the regions being shaped as one or more visual features, a polarizer, and a mounting assembly including a first mount for the first element and a second mount for the polarizer. At least the first or second mount is rotatable with respect to an optical axis between a first orientation and a second orientation. In the first orientation, the visual features are visible in the image of the object and, in the second orientation, the visual features are not visible in the image of the object.

Embodiments of the apparatus can include one or more of the following features. For example, the first element can be arranged so that the one or more regions substantially transmit a first polarization state of light and substantially block a second polarization state of light orthogonal to the first polarization state. In the first orientation, the polarizer can be oriented so that it substantially transmits light having the second polarization state and substantially blocks light having the first polarization state. In the second orientation, the polarizer can be oriented so that it substantially transmits light having the first polarization state and substantially blocks light having the second polarization state.

The polarizer can be a linear polarizer. The second mount can be rotatable about an axis that allows rotation of a transmission axis of the polarizer.

The polarizing material can be formed of a wire-grid polarizer. The first element can include a substrate supporting the polarizing material. The substrate can be substantially transparent. The substrate can be formed from glass or plastic.

The optical axis can be a straight optical axis or a folded optical axis.

The visual elements can include one or more alpha-numeric characters. The visual elements can include lines. The visual elements can include pictures. The visual elements can include icons.

In another aspect, the invention features a microscope that includes the apparatus.

In another aspect, the invention features a range finder that includes the apparatus.

In another aspect, the invention features a heads-up display that includes the apparatus.

In another aspect, the invention features a spotting scope that includes the apparatus.

In general, in a further aspect, the invention features an apparatus that includes a substrate and regions of a polarizing material disposed on a the substrate, the regions being interspersed by regions devoid of the polarizing material, where the polarizing material is formed from a wire-grid polarizer and the regions are shaped as alpha-numeric characters, grid lines, pictures, or icons.

The details of one or more embodiments are set forth in the accompanying drawings and the description below. Other features and advantages will be apparent from the description, drawings, and claims.

DESCRIPTION OF DRAWINGS

FIG. 1 is a perspective view of an optical device.
FIGS. 2A and 2B are a cross-sectional views of an optical element.

DETAILED DESCRIPTION

Figure 3A:
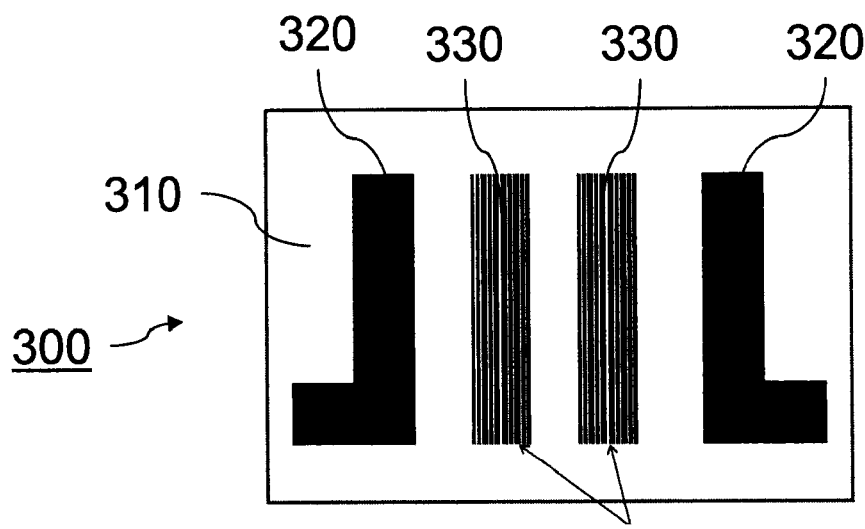
FIGS. 3A-3C are plan views of an optical element.

Referring to FIG. 1, an optical device 100 includes a first optical element 120 and a second optical element 130 that are positioned between an object 110 and a viewer 101.

A Cartesian co-ordinate system is provided for reference. Object 110 emits, transmits and/or reflects randomly-polarized light including light 111 that propagates parallel to the z-axis towards optical device 100. In general, the nature of object 110 depends on the specific application for which optical device 100 is used. For example, where optical device 100 is part of a microscope, object 110 can be a specimen under study positioned within the working distance of the microscope. Where optical device 100 is part of a spotting scope, on the other hand, object 110 can be a target some distance away.

First optical element 120 includes a polarizer 124 (e.g., an absorbing, sheet polarizer) that linearly polarizes incident light. In other words, polarizer 124 substantially transmits light (e.g., at operational wavelengths, transmits about 80% or more, about 85% or more, about 90% or more, about 95% or more of light) of light 111 having its polarization state parallel to a transmission axis of the polarizer, and substantially blocks (e.g., reflects and/or absorbs) light 111 polarized orthogonal to the transmission axis (e.g., at operational wavelengths, blocks about 95% or more, 98% or more, 99% or more, 99.5% or more, 99.9% or more). Polarizer 124 is arranged in a mount 122 that can be rotated about the z-axis as shown by arrow 128. Mount 122 includes a handle 126 that facilitates the rotation of polarizer 124, and hence the transmission axis of polarizer 124, by an angle $\alpha$.

Second optical element 130 includes a patterned polarizer 134 having polarizing regions 136A, 136B, 136C, and 136D. Polarizing regions 136A-136D include a linearly polarizing layer formed of a wire grid polarizer having its transmission axis oriented parallel to the y-axis. Accordingly, these regions substantially transmit light polarized parallel to the y-axis. The regions between polarizing regions 136A-D substantially transmit light of both polarization states incident thereon. Patterned polarizer 134 is arranged in a mount 132 that is fixed with respect to its angular orientation about the z-axis so that the position of polarizing regions 136A-136D and the orientation of their transmission axes remain fixed during operation of optical device 100.

FIG. 1 illustrates optical device 100 in two different configurations. In the first configuration, handle 126 is in position A. In this configuration, the transmission axis of polarizer 124 is oriented parallel to the x-axis. Accordingly, light transmitted through polarizer 124 toward patterned polarizer 134 is linearly polarized parallel to the x-axis as depicted by arrow 113. Because this light is polarized parallel to the transmission axes of polarizing regions 136A-D of polarizer 134, the polarizing regions of polarizer 134 substantially transmit the light. Since the regions of polarizer 134 between polarizing regions 136A-D also substantially transmits this light, polarizer 134 is appears transparent across its area to viewer 101. Accordingly, viewer 101 simply sees object 101, but not any visual features corresponding to polarizing regions 136A-D.

In the second configuration, handle 126, denoted 126', is in position B. Here, the transmission axis of polarizer 124 is oriented parallel to the y-axis. Light transmitted through polarizer 124 toward patterned polarizer 134 is therefore linearly polarized parallel to the y-axis, as depicted by arrow 112, orthogonal to the transmission axes of polarizing regions 136A-D. Accordingly, polarizing regions 136A-D block the light, while the light is transmitted by the regions of polarizer 134 between polarizing regions 136A-D. The polarizing regions 136A-D appear dark to the viewer, while the regions between appear transparent. The effect to viewer 101 is a field of view that includes the visual features provided by polarizing regions 136A-D superimposed over object 110.

In general, polarizing regions 136A-D can be formed to provide a variety of different visual features including, for example, alpha-numeric symbols (e.g., letters or numerals), lines (e.g., gridlines) and other geometric shapes (e.g., circles or polygons), or pictures (e.g., icons or logos). The particular visual features will obviously be selected based on the particular application for which optical device 101 is used.

Element 122 can also be adjusted to positions between A and B to provide varying contrast levels between the visual features on polarizer 136 and the background.

Polarizers 124 and 134 can be operational for radiation at more than one wavelength, such as for a continuous band of wavelengths. For example, these polarizers can polarize radiation for a band of wavelengths about 50 nm wide or more (e.g., about 100 nm wide or more, about 200 nm wide or more, about 300 nm wide or more). In certain embodiments, linear polarizer 100 polarizes radiation, for substantially the entire visible portion of the electromagnetic spectrum (e.g., for $\lambda$ from about 400 nm to about 700 nm). Alternatively, linear polarizer 100 can polarize radiation for substantially the entire near infrared portion of the electromagnetic spectrum (e.g., from about 1,200 nm to 2,000 nm). In certain embodiments, linear polarizer 100 polarizes radiation for substantially the entire visible and near infrared portions of the electromagnetic spectrum (e.g., from about 400 nm to about 2,000 nm).

Polarizers 124 and 134 (in polarizing regions 136A-D) can have a relatively high extinction ratio, $E_T$, for transmitted light at operational wavelength $\lambda$. For transmitted light, the extinction ratio refers to the ratio of pass state intensity at $\lambda$ to the block state intensity transmitted by a polarizer. $E_T$ can be, for example, about 30 or more at $\lambda$ (e.g., about 50 or more, about 100 or more, about 150 or more). In certain embodiments where block state transmission is relatively low, $E_T$ can be very high, such as about 1000 or more.

In some embodiments, polarizers 124 and 134 (in polarizing regions 136A-D) can have a relatively high extinction ratio, $E_R$, for reflected light at $\lambda$. $E_R$ is the ratio of the reflected intensity of block state radiation to the reflected intensity of pass state radiation at $\lambda$. $E_R$ can be, for example, about 30 or more (e.g., about 50 or more, about 100 or more, about 150 or more).

In certain embodiments, both $E_T$ and $E_R$ are relatively high.

Referring to FIGS. 2A-2B, FIG. 2A shows a cross-sectional view of a portion of polarizer 134, including polarizing region 136A. Polarizer 134 includes a substrate 210 and a polarizing layer 220. Polarizing layer 220 includes polarizing region 136A, and non-polarizing regions 221. Polarizing region 136A is formed from a wire grid polarizer, which includes a series of grating lines 224 separated by gaps 226. Grating lines 224 extend along the y-direction, forming a periodic structure. As shown in FIG. 2B, grating lines 224 have a width w in the x-direction. The grating lines repeat with a period, p, that is smaller than the operational wavelength $\lambda$ and as a result light of wavelength $\lambda$ interacts with the wire grid polarizer without encountering significant high-order diffraction that can occur when light interacts with periodic structures.

In general, w can be about $0.2\lambda$ or less (e.g., about $0.1\lambda$, or less, about $0.05\lambda$ or less, about $0.04\lambda$ or less, about $0.03\lambda$ or less, about 0.02λ or less, 0.01λ, or less). For example, in some embodiments, w is about 200 nm or less (e.g., about 150 nm or less, about 100 nm or less, about 80 nm or less, about 70 nm or less, about 60 nm or less, about 50 nm or less, about 40 nm or less, about 30 nm or less).

In general, p is less than λ, such as about 0.5λ or less (e.g., about 0.3λ or less, about 0.2λ or less, about 0.1λ, or less, about 0.08λ or less, about 0.05λ or less, about 0.04λ, or less, about 0.03λ, or less, about 0.02λ, or less, 0.01λ or less). In some embodiments, p is about 500 nm or less (e.g., about 300 nm or less, about 200 nm or less, about 150 nm or less, about 130 nm or less, about 100 nm or less, about 80 nm or less, about 60 nm or less, about 50 nm or less, about 40 nm or less).

The duty cycle of the wire grid polarizer, given by the ratio w:p, can vary as desired. In some embodiments, the duty cycle is less than about 50% (in other words w:p is less than 1:2) (e.g., about 40% or less, about 30% or less, about 20% or less). Alternatively, in certain embodiments, the duty cycle is more than about 50% (e.g., about 60% or more, about 70% or more, about 80% or more).

The thickness, d, of the wire grid polarizer measured along the z-axis can vary as desired. In general, d is selected based on the optical properties (e.g., refractive index) of grating lines 224 and the desired optical properties of the wire grid polarizer at λ. In some embodiments, d can be about 50 nm or more (e.g., about 75 nm or more, about 100 nm or more, about 125 nm or more, about 150 nm or more, about 200 nm or more, about 250 nm or more, about 300 nm or more, about 400 nm or more, about 500 nm or more, about 1,000 or more, such as about 2,000 nm).

The aspect ratio of the wire grid polarizer refers to the ratio of d to the line width, w. In some embodiments, d:w can be about 2:1 or more (e.g., about 3:1 or more, about 4:1 or more, about 5:1 or more, about 8:1 or more, about 10:1 or more).

In general, the composition of grating lines 224 are selected so that the wire grid polarizer has desired polarizing properties. Grating lines 224 can be formed from a metal, such as Au, Ag, Al, Cr, and Cu.

The structure and composition of the wire grid polarizer is selected based on the desired optical performance of the wire grid polarizer. Structural parameters that affect the optical performance of the wire grid polarizer include, for example, d, w, and p. Typically, varying a single parameter affects multiple different performance parameters. For example, the overall transmission of the wire grid polarizer at λ, can be varied by changing the duty cycle of the polarizer. However, while a lower duty cycle may provide relatively higher transmission of the pass state polarization, it also results in higher transmission of the block state polarization, which decreases $E_T$. As a result, optimizing the polarizer's performance involves tradeoffs between different performance parameters and the polarizer's structure and composition is varied depending on the desired performance for the polarizer's end use application.

In general, to effectively polarize light at wavelength λ, the period p of the wire grid polarizer should be shorter than λ, such as about λ/4 or less (e.g., about λ/6 or less, about λ/10 or less). Moreover, for effective broadband performance, p should be shorter than the shortest wavelength in the wavelength band. For a broadband polarizer in the visible spectrum, for example, w should be less than about 300 nm, such as about 200 nm or less (e.g., about 150 nm or less, about 130 nm or less, about 110 nm or less, about 100 nm or less, about 90 nm or less, about 80 nm or less).

In some embodiments, $E_T$ can be increased by increasing the depth of the wire grid polarizer, d. Increasing d can provide increased $E_T$ without substantially reducing the amount of pass state transmission.

In general, substrate 210 provides mechanical support to the wire grid polarizer. Substrate 210 substantially transmits light at wavelength λ. In general, substrate 210 can be formed from any material compatible with the manufacturing processes used to produce polarizer 134. In certain embodiments, substrate 210 is formed from a glass, such as BK7 (available from Abrisa Corporation), borosilicate glass (e.g., pyrex available from Corning), aluminosilicate glass (e.g., C1737 available from Corning), or quartz/fused silica.

Referring again to FIG. 1, while polarizer 124 can be rotated and patterned polarizer 134 is fixed with respect to the co-ordinate system in optical device 100, other configurations are also possible. For example, in some embodiments, polarizer 124 can be fixed while patterned polarizer 134 can be rotated. In certain embodiments, both polarizer 124 and patterned polarizer 134 can be rotated about the z-axis.

Furthermore, while regions 136A-D in optical device 100 all have their transmission axes oriented in the same direction, other configurations are also possible. For example, in some embodiment, different regions can have their transmission axes oriented along different directions, so that the relative gray level of different regions varies for different orientation angles, α, of the transmission axis of polarizer 124. In certain embodiments, different regions of polarizer 134 have their transmission axes orthogonal to one another, so that one set of visual features is visible with the system in configuration A, while a second, different set of visual features are visible in configuration B.

While mount 122 of optical element 120 is depicted as being manually adjustable, other configurations are also possible. For example, the mount can be coupled to an electromechanical actuator configured to rotate polarizer 124 in response to a signal from control electronics.

Moreover, while FIG. 1 shows a human viewer 101, in some embodiments optical devices can include an electronic sensor instead of, or in addition to, an optical path for a human viewer. For example, optical device 100 can include an electronic image sensor (e.g., a CCD camera) positioned in place of viewer 101.

Figure 3B:
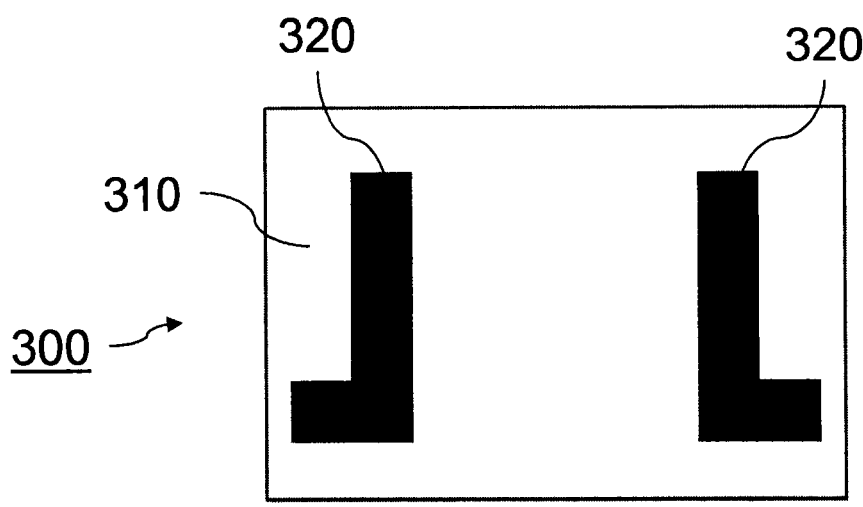
Figure 3C:
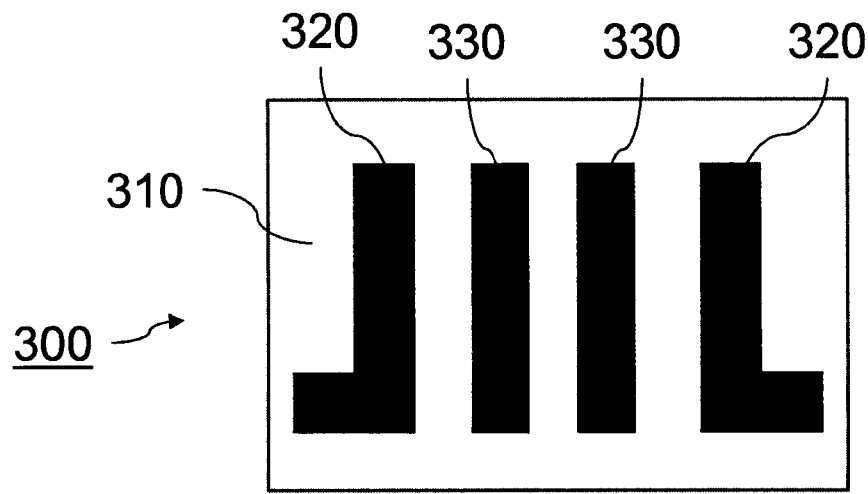

In some embodiments, optical elements can include opaque regions (e.g., formed from a black or colored ink) in addition to polarizing regions. For example, referring to FIGS. 3A-C, an optical element 300 includes polarizing regions 330 and opaque regions 320 disposed on a transparent substrate 310. When illuminated with light polarized parallel to the transmission axes of polarizing regions 330, only the visual features corresponding to opaque regions 320 are visible to a viewer, as shown in FIG. 3B. However, when illuminated with light polarized orthogonal to the transmission axes of polarizing regions 330, the visual features corresponding to both regions 320 and 330 are visible to the viewer.

Further, while polarizing regions 136A-D are formed from wire-grid polarizers, other types of polarizing materials can also be used. For example, a patterned layer of a polymer-based sheet polarizer (e.g., liquid crystal polymer) can be used. Furthermore, while optical device 100 implements the varying visual features using linearly polarized light, other configurations can also be used. For example, optical devices can be configured to operate using circularly polarized light.

In general, the polarizing regions of polarizer 134 can be formed using a variety of techniques. For example, in some embodiments, patterned polarizers are formed by first forming a continuous wire-gird polarizer layer and subsequently patterning the layer using conventional patterning methods.

Exemplary techniques for forming wire-grid polarizers are described, for example, in US 2005-0277063 A1, entitled "OPTICAL FILMS AND METHODS OF MAKING THE SAME," filed May 27, 2008, and in US 2006-0127829 A1, entitled "STRUCTURES FOR POLARIZATION AND BEAM CONTROL," filed Nov. 3, 2005, the entire contents both of which are incorporated herein by reference.

Conventional patterning techniques include photolithography and nano-imprint lithography. Positive or negative resists can be used in the patterning process.

For example, in some embodiments, depending on the depth of the wire-grid polarizer layer, a 1 micron to 4 micron thick layer of resist can be disposed over the wire-grid polarizer layer, exposed, and developed to expose portions of the wire-grid polarizer layer between the remaining regions of patterned resist. The resist and wire-gird polarizer are then exposed to an etchant to remove portions of the wire-grid polarizer layer where the layer is exposed. Exemplary etch methods include dry etch methods (e.g., reactive ion etching) and wet etch methods (e.g., using dilute KOH, acids, and/or resist developers).

After etching, the remaining resist is removed, e.g., using a solvent (such as acetone or a chlorinated solvent, for example). The remaining resist can be removed using a dry etch method, or using a combination of wet and dry etching.

In some embodiments, a continuous layer of a material suitable for forming a wire-grid polarizer (e.g., aluminum) can be patterned using conventional lithographic techniques to form the visual features prior to forming the wire-grid polarizer. After the initial patterning step, the patterned layer of material can be coated with a further resist layer (e.g., a resist suitable for laser holography) and exposed for form a grating of appropriate period and duty cycle for the wire-grid polarizer. Subsequently, the grating can be transferred to the underlying material using conventional etch methods (e.g., reactive ion etching). Optionally, the resist mask can be modified prior to etching (e.g., with a metal cap layer).

In some embodiments, the patterned wire-grid polarizer can be coated with a layer of another material, e.g., to encapsulate the remaining wire-grid polarizer regions in order to protect them. For example, atomic layer deposition (ALD) can be used to deposit a thin, conformal layer of a dielectric material over the wire-grid polarizer (e.g., a 10 nm to 50 nm layer of $SiO_2$ can be formed over the wire-grid polarizer). Such ALD techniques are described, for example, in US 2005-0277063 A1, mentioned above.

Figure 4:
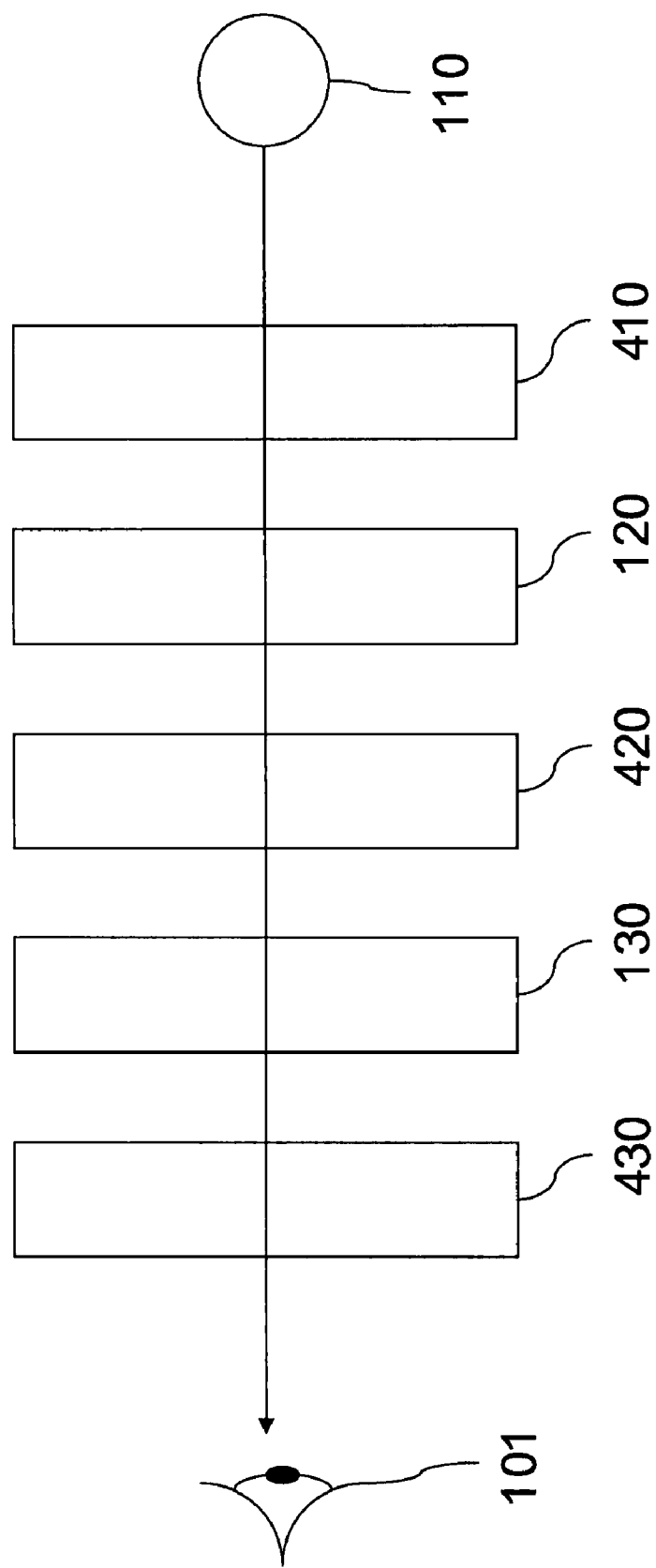
FIG. 4 is a schematic view of an optical device.

In general, optical device 100 can include other optical elements in addition to optical elements 120 and 130 shown in FIG. 1. For example, referring to FIG. 4, optical device 100 can include optical elements 410, 420, and/or 430, which are positioned in the optical path between object 101 and optical element 120, between optical elements 120 and 130, and between optical element 130 and viewer 101, respectively.

Optical elements 410, 420, and 430 can include, for example, refractive optical elements (e.g., lenses) and/or reflective optical elements (e.g., mirrors or prisms) arranged to provide an image of object 110 to viewer 101. For example, optical element 430 can be an eye piece lens. As another example, optical element 410 can be an objective lens. Element 420 can include one or more lenses, optical filters, and/or retardation films.

The image of object 101 can be magnified or reduced in size. Indeed, optical elements 410, 420, and/or 430, can also be arranged to image the visual features of polarizer 134 to viewer 101 so that when the system is configured so that the visual features are visible, the field of view of viewer 101 includes the features superimposed over the image of object 110.

In some embodiments, element 430 can be an additional polarizer. For example, element 430 can be an additional linear polarizer having its transmission axis fixed with respect to the transmission axes of polarizing regions of element 130 (e.g., at 45 degrees to the transmission axes of polarizing regions of element 130). In such cases, element 430 can be used to maintain the polarization of light at viewer 101 but with the contrast of the intensity of the entire image varying according to the orientation angle α of the transmission axis of polarizer 124 and with variable relative contrast between the polarizing regions 136A-D and its background at viewer 101.

In the foregoing embodiments, the optical path between object 110 and viewer 101 is a straight line. More generally, other configurations are possible. For example, the optical path can include one or more folds. Embodiments that include reflective elements, for example, would include such folds in the optical path.

Furthermore, while the embodiments discussed above involve transmissive optical elements featuring polarizing regions, other configurations are also possible. For example, in some embodiments, the optical element featuring the patterned polarizing regions can be configured to reflect, rather than transmit, incident light in the optical device.

In general, the optical devices discussed above can be used in a variety of applications. For example, optical devices can be included in imaging systems such as binoculars, range finders, spotting scopes, rifle scopes, telescopes, night vision equipment and microscopes. As an example, an optical device can be used in a microscope to display gridlines to a viewer, allowing the viewer to gauge the physical size of an object feature. By rotating changing the relative orientation of the polarization sensitive features and polarized light used to form the image, the gridlines can be removed from the image in a conventional imaging mode. Additional applications include remote sensing and weapons targeting systems. The optical devices could also be used in head-up displays (e.g., in automobiles or aircraft) or in head-mounted displays.

A number of embodiments of the invention have been described. Nevertheless, it will be understood that various modifications may be made without departing from the spirit and scope of the invention. Other embodiments are in the following claims.

What is claimed is:

1. An apparatus, comprising:
    a plurality of optical elements arranged to form an image of an object, the elements comprising:
        a first element comprising one or more regions of a polarizing material, the regions being shaped as one or more visual features; and
        a polarizer; and
    a mounting assembly including a first mount for the first element and a second mount for the polarizer, wherein at least the first or second mount is rotatable with respect to an optical axis between a first orientation and a second orientation,
    wherein, in the first orientation, the visual features are visible in the image of the object and, in the second orientation, the visual features are not visible in the image of the object.

2. The apparatus of claim 1, wherein the first element is arranged so that the one or more regions substantially transmit a first polarization state of light and substantially block a second polarization state of light orthogonal to the first polarization state.

3. The apparatus of claim 2, wherein, in the first orientation, the polarizer is oriented so that it substantially transmits light having the second polarization state and substantially blocks light having the first polarization state.

4. The apparatus of claim 2, wherein, in the second orientation, the polarizer is oriented so that it substantially transmits light having the first polarization state and substantially blocks light having the second polarization state.

5. The apparatus of claim 1, wherein the polarizer is a linear polarizer.

6. The apparatus of claim 5, wherein the second mount is rotatable about an axis that allows rotation of a transmission axis of the polarizer.

7. The apparatus of claim 1, wherein the polarizing material is formed of a wire-grid polarizer.

8. The apparatus of claim 7, wherein the first element comprises a substrate supporting the polarizing material.

9. The apparatus of claim 8, wherein the substrate is substantially transparent.

10. The apparatus of claim 8, wherein the substrate is formed from glass or plastic.

11. The apparatus of claim 1, wherein the optical axis is a straight optical axis.

12. The apparatus of claim 1, wherein the optical axis is a folded optical axis.

13. The apparatus of claim 1, wherein the visual elements comprise one or more alpha-numeric characters.

14. The apparatus of claim 1, wherein the visual elements comprise lines.

15. The apparatus of claim 1, wherein the visual elements comprise pictures.

16. The apparatus of claim 1, wherein the visual elements comprise icons.

17. A microscope, comprising the apparatus of claim 1.

18. A range finder, comprising the apparatus of claim 1.

19. A heads-up display, comprising the apparatus of claim 1.

20. A spotting scope, comprising the apparatus of claim 1.

* * * * *